Patented Sept. 27, 1949

2,483,387

UNITED STATES PATENT OFFICE 2,483,387

STABILIZED SOLUTION OF 1-METHYL-5-ISOPROPYL-5-ALLYL BARBITURIC ACID SODIUM SALT

Otto Schnider, Basel, Switzerland, assignor to Hoffmann-La Roche Inc., Nutley, N. J., a corporation of New Jersey No Drawing. Application January 31, 1946, Serial No. 644,668. In Switzerland March 22, 1945

1 Claim. (Cl. 260—257)

The present invention relates to the manufacture of stabilised, aqueous solutions of the alkali salts of 1-methyl-5-isopropyl-5-allyl-barbituric acid.

The sodium salt of 1-methyl-5-isopropyl-5-allyl-barbituric acid, on parenteral administration, exerts an immediate narcotic action of short duration. It therefore finds employment as a short-action narcotic introduced intravenously. However, aqueous solutions of the alkali salts of 1-methyl-5-isopropyl-5-allyl-barbituric acid are only stable for a short time so that they have to be prepared directly before use.

It has now been found, according to the present invention, that the acetic diethylamide is a suitable stabiliser for aqueous solutions of the alkali salts of 1-methyl-5-isopropyl-5-allyl-barbituric acid. An advantageous method for preparing such solutions consists in first dissolving 1-methyl-5-isopropyl-5-allyl-barbituric acid in acetic diethylamide and subsequently transforming the said barbituric acid into its alkali salt by adding alkali-liquor. The dissolution of the solid 1-methyl-5-isopropyl-5-allyl-barbituric acid in the stabiliser prior to the addition of the alkali-liquor can be facilitated by the addition of glycerine. However, it is also possible to carry out the invention by adding acetic diethylamide to an aqueous solution of the alkali salt of 1-methyl-5-isopropyl-5-allyl-barbituric acid. For sterilisation purposes, the solutions are heated, or p-hydroxy-benzoic-acid-methyl-ester and p-hydroxy-benzoic-acid-propyl-ester added.

The solutions prepared in accordance with the present invention, even after long storing, showed the same norcotic action and the same toxicity as a freshly prepared solution. Whereas a 10 per cent aqueous solution of the sodium salt of 1-methyl-5-isopropyl-5-allyl-barbituric acid, which had been heated for 17 hours to 100° C., turned considerably turbid by separation of decomposition products in the form of drops, the solution stabilised with acetic diethylamide remained clear and colorless after the same treatment. Upon analytic examination it could be established that in the non-stabilised solution 18.4 per cent of the initial compound was destroyed, whereas in the stabilised solution the decomposition only amounted to 6 per cent. No decomposition products could be observed in a stabilised solution that had been stored for 4 weeks at 23° C.

The solutions of the alkali salts of 1-methyl-5-isopropyl-5-allyl-barbituric acid stabilised with acetic diethylamide are to be employed as medicinal preparations.

Example 9.15 parts by weight of 1-methyl-5-isopropyl-5-allyl-barbituric acid are dissolved in a mixture of 18 parts by weight of acetic diethylamide and 9.5 parts by weight of about 85 per cent glycerine while heating slightly. The clear solution is cooled and 40 parts by volume of an aqueous-N-solution of caustic soda are added. The solution is brought to 100 parts by volume by the addition of distilled water and, after filtration, filled into ampoules and sterilised.

Instead of sterilising the ampoules by heating, sterile solutions can also be obtained by adding thereto prior to filtration 0.08 part by weight of p-hydroxy-benzoic-acid-methyl-ester and 0.01 part by weight of p-hydroxy-benzoic-acid-propyl-ester.

I claim:

Aqueous solutions containing a 1-methyl-5-isopropyl-5-allyl-barbituric acid sodium salt and as a stabilizer therefor acetic diethylamide.

OTTO SCHNIDER.

REFERENCES CITED

The following references are of record in the file of this patent:

UNITED STATES PATENTS

| Number | Name | Date |
|---|---|---|
| 1,921,722 | Berendes et al. | Aug. 8, 1933 |
| 2,027,905 | Goth | Jan. 14, 1936 |
| 2,067,317 | Gruber | Jan. 12, 1937 |
| 2,067,318 | Gruber | Jan. 12, 1937 |
| 2,408,289 | Bush | Sept. 24, 1946 |

FOREIGN PATENTS

| Number | Country | Date |
|---|---|---|
| 540,016 | Germany | Dec. 5, 1931 |